(12) United States Patent
Sorensen

(10) Patent No.: US 9,032,729 B2
(45) Date of Patent: May 19, 2015

(54) HEATED-AIR CONDUIT FOR ENERGY CONVERSION SYSTEMS AND METHODS

(76) Inventor: Jens Ole Sorensen, Rancho Sante Fe, CA (US)

( * ) Notice: Subject to any disclaimer, the term of this patent is extended or adjusted under 35 U.S.C. 154(b) by 892 days.

(21) Appl. No.: 13/128,390

(22) PCT Filed: Dec. 10, 2009

(86) PCT No.: PCT/US2009/006482
§ 371 (c)(1),
(2), (4) Date: May 27, 2011

(87) PCT Pub. No.: WO2010/074715
PCT Pub. Date: Jul. 1, 2010

(65) Prior Publication Data
US 2012/0119511 A1    May 17, 2012

Related U.S. Application Data

(60) Provisional application No. 61/122,619, filed on Dec. 15, 2008.

(51) Int. Cl.
| | | |
|---|---|---|
| F03G 6/00 | (2006.01) | |
| F03G 7/00 | (2006.01) | |
| F24J 2/44 | (2006.01) | |
| F24J 2/52 | (2006.01) | |

(52) U.S. Cl.
CPC ... *F24J 2/44* (2013.01); *F24J 2/523* (2013.01); *F24J 2/5241* (2013.01); *Y02E 10/47* (2013.01)

(58) Field of Classification Search
USPC .......... 60/641.11, 641.12; 138/115–117, 138/123–128, 155; 290/54, 55; 52/169.4
See application file for complete search history.

(56) References Cited

U.S. PATENT DOCUMENTS

| | | | | |
|---|---|---|---|---|
| 2,661,488 | A | * | 12/1953 | Wilder Kenan .................. 14/19 |
| 3,436,908 | A | * | 4/1969 | Delic Vukasin Van ....... 126/634 |
| 3,894,393 | A | * | 7/1975 | Carlson ......................... 60/641.1 |
| 4,359,870 | A | * | 11/1982 | Holton, Sr. ................. 60/641.12 |
| 4,367,627 | A | * | 1/1983 | Pretini ....................... 60/641.12 |
| 4,497,177 | A | * | 2/1985 | Anderson .................. 60/641.12 |
| 7,013,929 | B2 | * | 3/2006 | Laurent et al. ................ 138/123 |
| 7,026,723 | B2 | * | 4/2006 | Moreno .......................... 290/55 |
| 2009/0095368 | A1 | * | 4/2009 | Johnson et al. ................. 138/39 |

* cited by examiner

*Primary Examiner* — Christopher Jetton
(74) *Attorney, Agent, or Firm* — Edward W. Callan

(57) ABSTRACT

In an energy conversion system, a flexible conduit is disposed on the outside of a high rise of terrain drawing a stream of heated air through the conduit from a low to a higher elevation, a support structure supports the flexible conduit to maintain a substantially uniform cross-sectional area of the conduit orthogonal to its longitudinal axis. A plurality of longitudinal sections are included that individually include a plurality of lateral modular segments disposed orthogonally about the longitudinal axis of the conduit to laterally enclose the interior of the individual section of the conduit. The conduit has an interior surface of a repetitive varying contour that reduces friction between the interior surface and the air that flows through the conduit.

11 Claims, 6 Drawing Sheets

HEATED-AIR CONDUIT FOR ENERGY CONVERSION SYSTEMS AND METHODS

The present invention generally pertains to energy conversion systems and methods and is directed to improvements to a heated-air conduit system for the type of energy conversion system in which heated air flows through a rising conduit for production of electrical energy.

In one such energy conversion system, which is described in U.S. Pat. No. 3,436,908, air within an upwardly extending hollow tube is heated by absorbing heat from heat-conductive materials surrounding the tube that are heated by solar radiation. The heated air within the tube expands and becomes lighter, and is displaced by atmospheric air through the bottom of the tube, thus creating air flow through the tube. Said patent suggests using the stream of air heated by the solar collector to produce electrical energy.

Another such energy conversion system is described in International Patent Application No. PCT/US2008/008356, filed Jul. 7, 2008 by Jens Ole Sorensen, the inventor of the subject matter of the present application.

In such energy conversion systems, the cross-sectional area of the conduit may be of such a magnitude that the weight of the conduit causes the conduit to flex and thereby reduce the cross-sectional area by varying amounts over the length of the conduit.

In one aspect, the present invention provides a conduit system for use in an energy conversion system, comprising: a flexible conduit disposed on the outside of a high rise of terrain to draw a stream of heated air through the conduit, wherein the conduit extends from a first elevation to a second elevation that is of a higher elevation than the first elevation, with at least a portion of the conduit leading in a direction that is non-orthogonal to vertical and horizontal; and a support structure that supports a substantial substantial portion of the the flexible conduit in such a manner as to maintain a substantially uniform cross-sectional area of the conduit orthogonal to the longitudinal axis of the conduit, wherein the support structure comprises a plurality of pillars secured to the terrain and intermittently disposed adjacent to opposite sides of the conduit along a substantial portion of the length of the conduit; and a plurality of primary cables that so connect individual said pillars to portions of the conduit at various positions along the orthogonal perimeter of the conduit as to pull the portions of the walls of the conduit to which the pillars are connected away from the longitudinal axis of the conduit.

In another aspect, the present invention provides a conduit system for use in an energy conversion system, comprising: a conduit disposed along a high rise of terrain to draw a stream of heated air through the conduit, wherein the conduit extends from a first elevation to a second elevation that is of a higher elevation than the first elevation, with a significant section of the conduit leading in a direction that is non-orthogonal to vertical and horizontal, and wherein at the higher elevation, the conduit divides into a plurality of branch conduits; a grid of one or more valves disposed at the upper end of each branch conduit for releasing the air from the branch conduits into an external environment; and sensors for sensing the air pressure within the branch conduits; wherein the valves can be operated to regulate air pressures within the branch conduits.

In yet another aspect, the present invention provides a conduit disposed along a high rise of terrain, such as a mountain, to draw a stream of heated air through the conduit, wherein the conduit extends from a first elevation to a second elevation that is of a higher elevation than the first elevation, with a significant section of the conduit leading in a direction that is non-orthogonal to vertical and horizontal, the conduit comprising: a plurality of longitudinal sections that individually include a plurality of lateral modular segments that are disposed orthogonally about the longitudinal axis of the conduit to laterally enclose the interior of the individual section of the conduit.

In a further aspect, the present invention provides a conduit having an interior surface of a repetitive varying contour that reduces friction between the interior surface and the air that flows through the conduit.

The present invention additionally provides methods for utilizing conduits according to the different aspects of the present invention to facilitate conversion of heated air to electrical energy Additional features of the present invention are described with reference to the detailed description of the exemplary embodiments.

The drawing figures herein are not drawn to scale.

Figure 1:
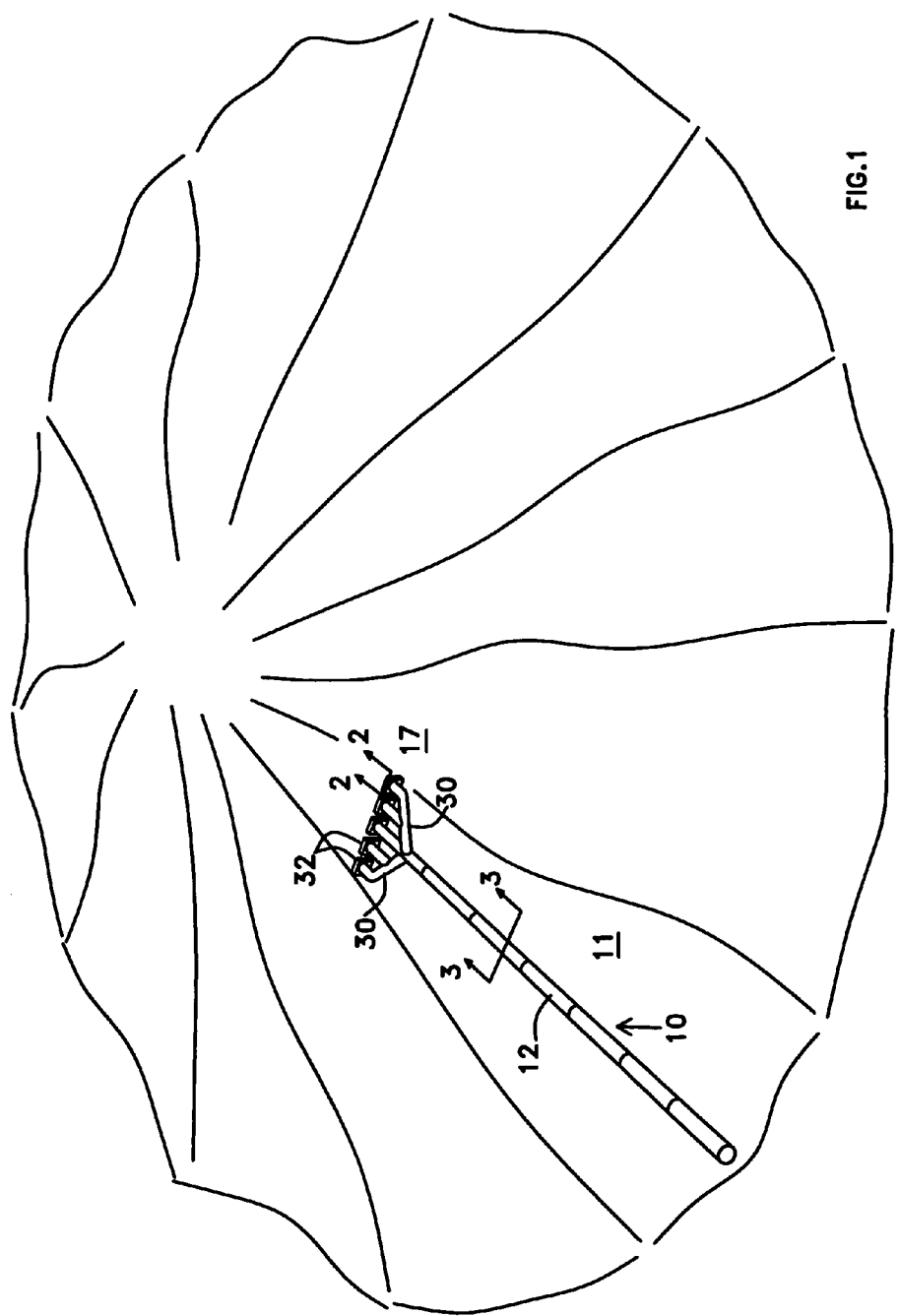
FIG. 1 is a view of a portion of an exemplary conduit system according to the present invention disposed along a high rise of terrain in a solar energy conversion system.
Figure 2:
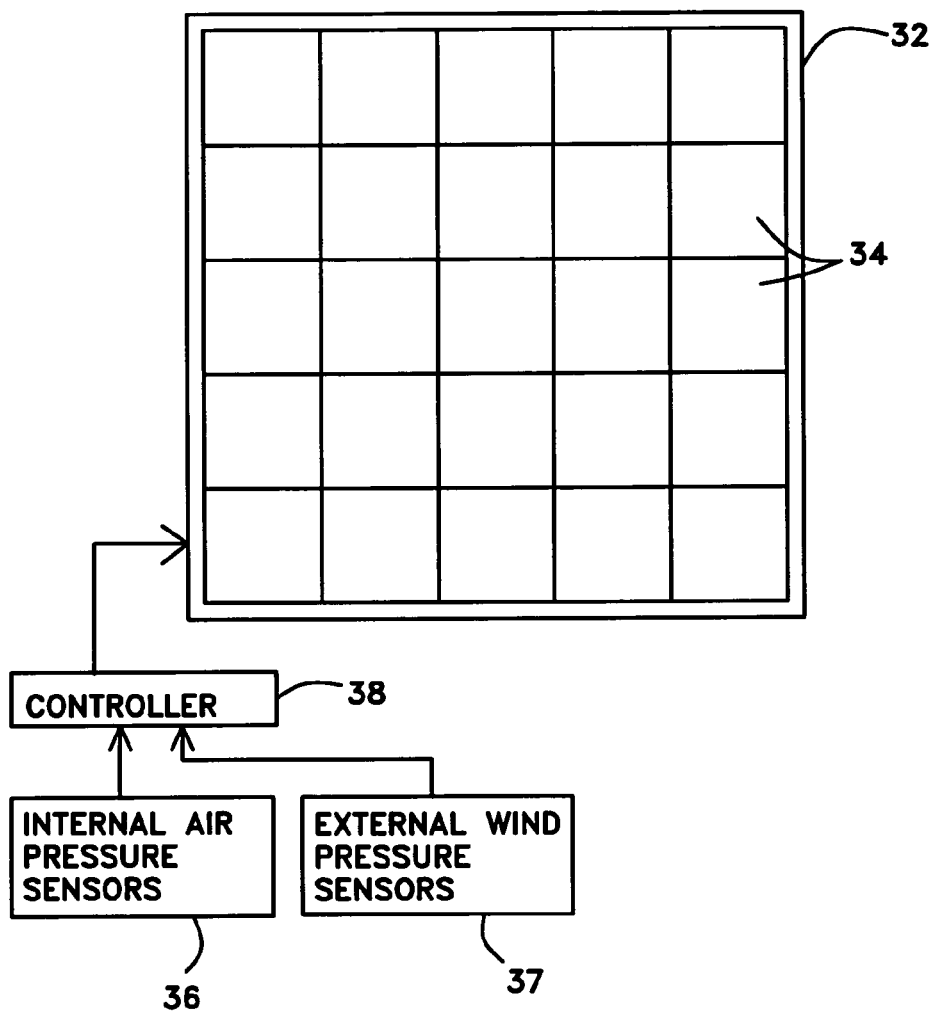
FIG. 2 is a view of an exemplary grid of valves that is disposed at the upper end of a branch conduit taken along section line 3-3 in FIG. 1, and further including a schematic diagram of a controller and sensors that are related to operation of the valves for controlling the air pressure within the branch conduits.
Figure 3:
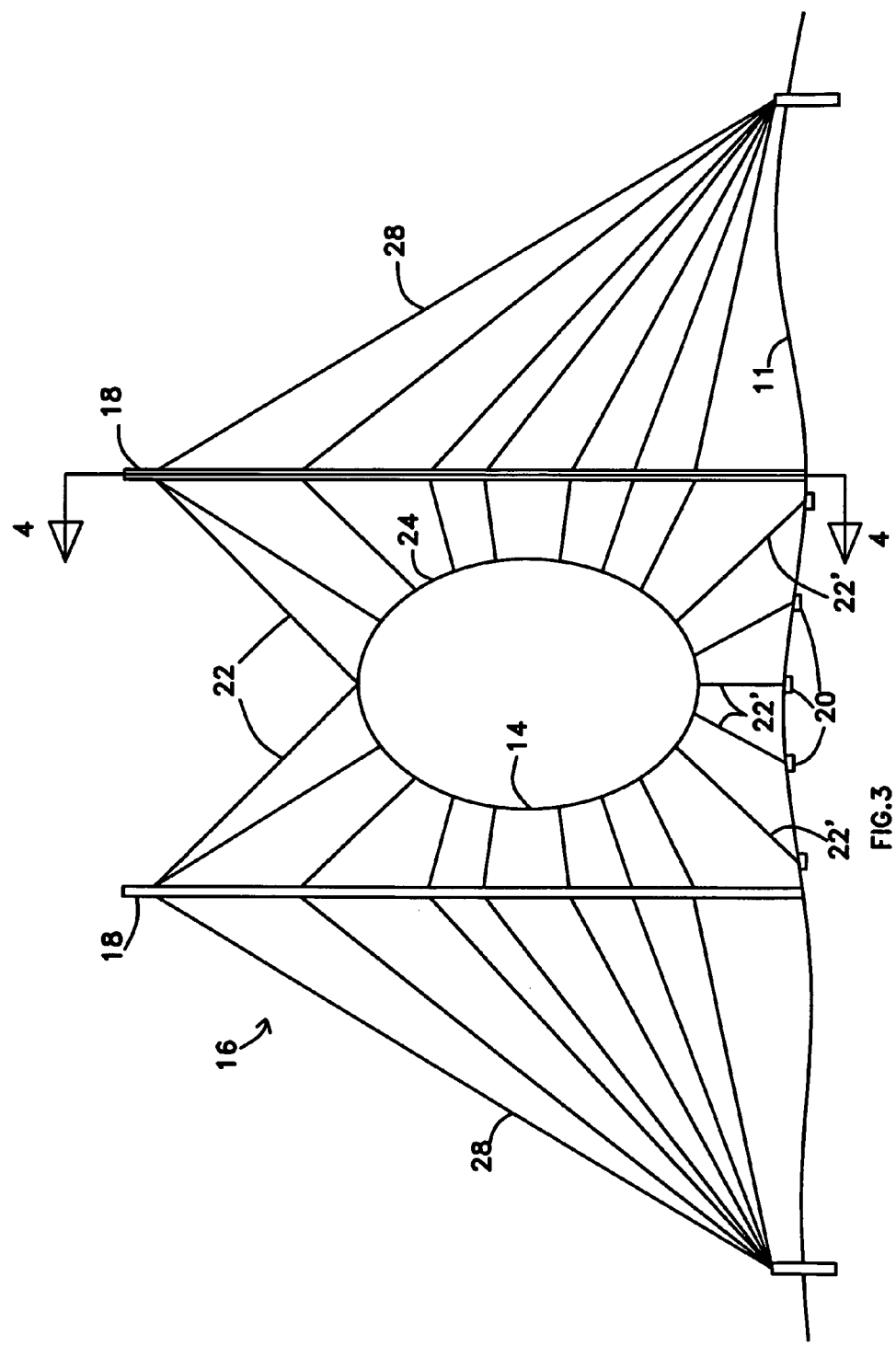
FIG. 3 is a vertical sectional view of the conduit taken along section line 3-3 in FIG. 1 and further showing a support structure that supports the conduit.
Figure 4:
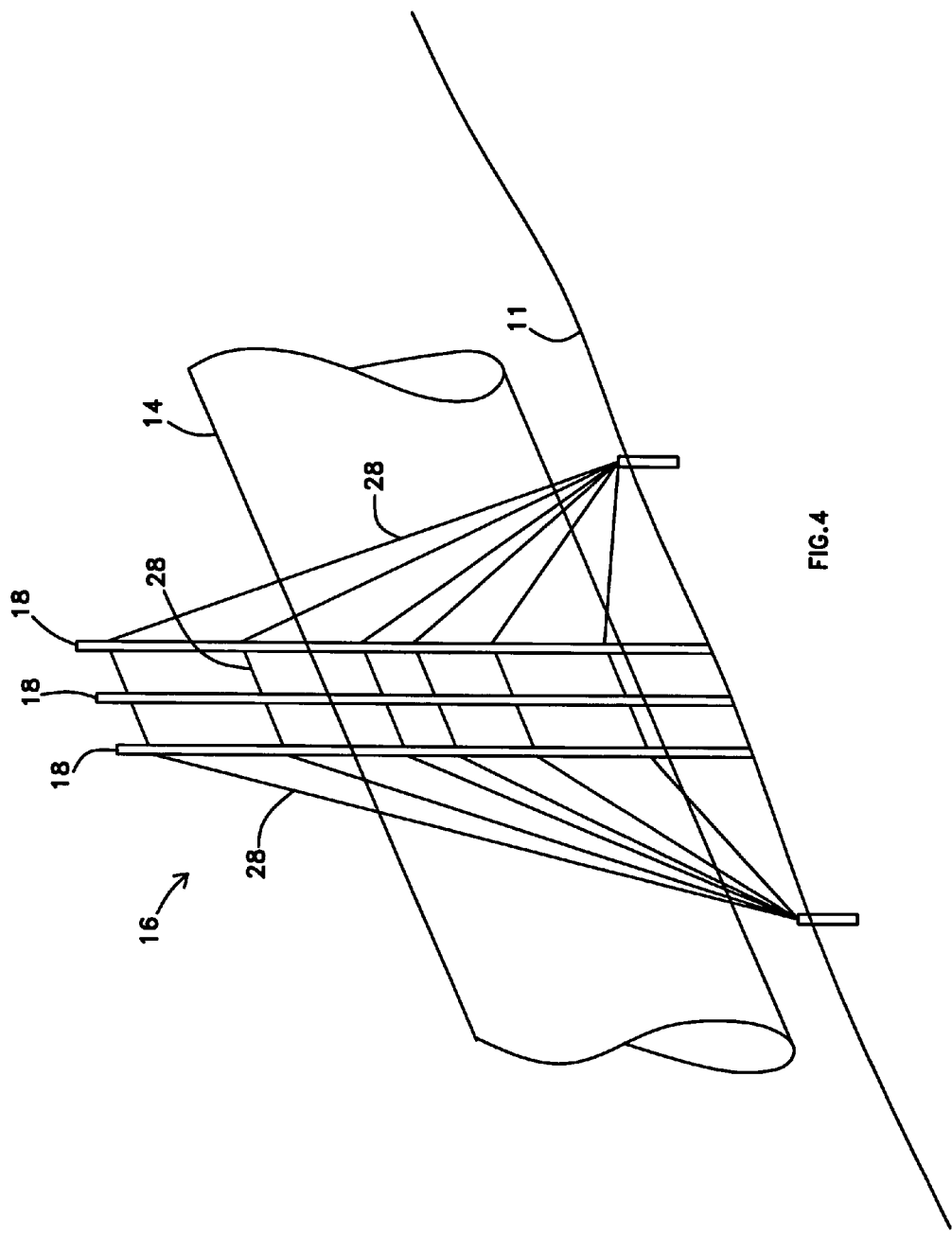
FIG. 4 is a vertical sectional view taken along section line 4-4 in FIG. 3 of an additional aspect of the support structure shown in FIG. 3.

Referring to FIGS. 1, 2, 3 and 4, an exemplary embodiment of a heated-air conduit system 10 according to the present invention is adapted for installation in and over a sloping terrain 12. The conduit system 10 includes a conduit 14 and a support structure 16, which is shown in FIGS. 3 and 4.

The conduit 14 is made of one or more materials, such as plastic, aluminum and steel. The conduit 14 is disposed on the outside of a high rise of terrain 12 to draw a stream of heated air through the conduit 14. The conduit 14 extends from a first elevation to a second elevation 17 that is of a higher elevation than the first elevation. The heated air is drawn through a turbine at the lower elevation to convert the kinetic energy of the heated air into electricity. At least a portion of the conduit 14 leads in a direction that is non-orthogonal to vertical and horizontal.

The support structure 16 supports a substantial portion of the flexible conduit 14 in such a manner as to maintain a substantially uniform cross-sectional area of the conduit 14 orthogonal to the longitudinal axis of the conduit 14. The support structure 16 includes a plurality of pillars 18, a plurality of grounded members 20, a plurality of primary cables 22, a plurality of additional primary cables 22', a plurality of bands 24 and a plurality of secondary cables 28.

The pillars 18 are secured to the terrain 11 and are intermittently disposed adjacent to opposite sides of the conduit 14 along a substantial portion of the length of the conduit 14. The distances between some of the pillars 18 along the length of the conduit 14 varies.

The plurality of grounded members 20 are secured to the terrain 11 and intermittently disposed beneath the conduit 14 along a substantial portion of the length of the conduit 14 at positions that correspond to the positions of the pillars 18.

The primary cables 22 so connect individual pillars 18 to portions of the conduit 14 at various positions along the orthogonal perimeter of the conduit 14 as to pull the portions of the walls of the conduit 14 to which the pillars 18 are connected away from the longitudinal axis of the conduit 14.

The additional primary cables 22' so connect individual grounded members 20 to portions of the conduit 14 at various positions along the orthogonal perimeter of the conduit 14 as to pull the portions of the walls of the conduit 14 to which the grounded members 20 are connected away from the longitudinal axis of the conduit 14.

The plurality of bands 24 are disposed about the orthogonal perimeter of the conduit 14 adjacent the pillars 18 and the grounded members 20. Individual bands 24 contain an array of fasteners that connect the primary cables 22 and the additional primary cables 22' to the conduit 14.

Some of the primary cables 22, 22' pull the top portion of the conduit 14 down from the longitudinal axis of the conduit 14. Some of the primary cables 22, 22' pull side portions of the conduit 14 away from the longitudinal axis of the conduit 14. Some of the primary cables 22 pull the bottom portion of the conduit 14 up from the longitudinal axis of the conduit.

The plurality of secondary cables 28 connect some of the pillars 18 to other pillars 18, and others of the secondary cables 28 so secure the pillars 18 to the terrain 11 as to maintain the pillars 11 in a desired upright disposition.

Referring again to FIGS. 1 and 2, at the higher elevation 17, the conduit 14 divides into a plurality of branch conduits 30. A grid 32 of one or more valves 34 is disposed at the upper end of each branch conduit 30 for releasing the air from the branch conduits 30 into an external environment.

The conduit 14 divides into the plurality of branch conduits 30 in order to reduce the speed of the heated air when the heated air is released into the external environment and thereby reduce the pressure of the heated air at the lower elevation after the heated air has been drawn through a turbine to convert the flow of the heated air into electricity.

A plurality of sensors 36 are disposed for sensing the air pressure within the branch conduits 30; and a plurality of sensors 37 are disposed for sensing the external wind pressures adjacent the upper ends of the respective branch conduits 30. A plurality of controllers 38 are coupled to the valves 34 and are adapted for operating the valves 34 to regulate air pressures within the branch conduits 30. The controllers are adapted for optimizing the balance of the air pressures within the plurality of the branch conduits 30 in accordance with the sensed external wind pressures.

Figure 5:
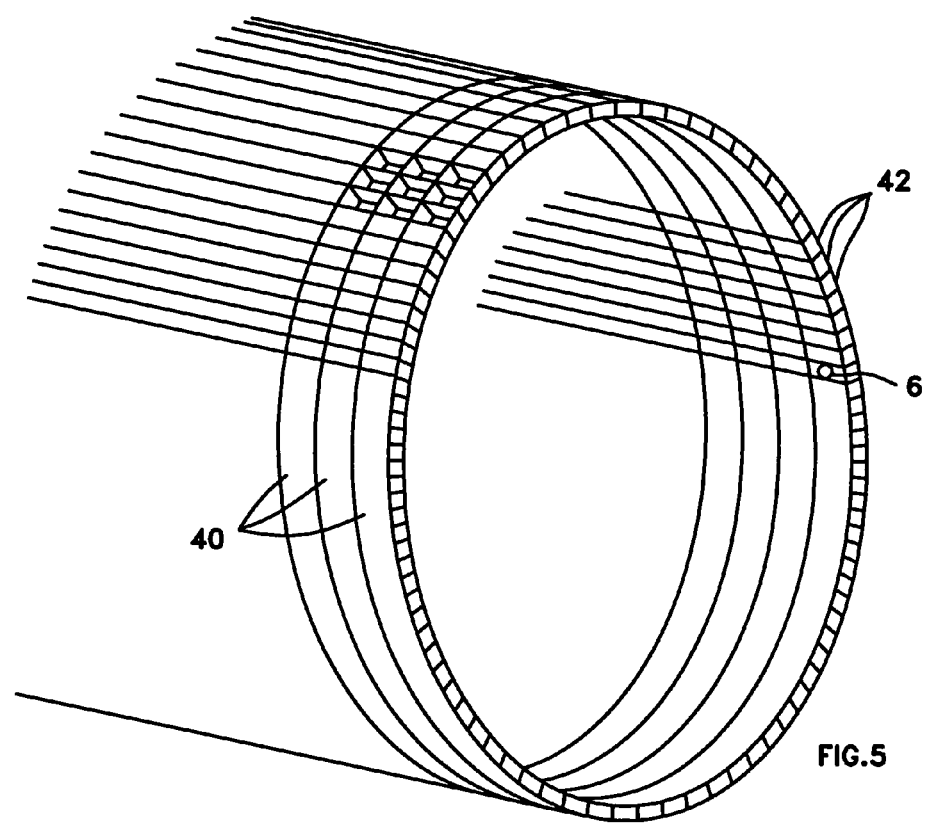
FIG. 5 is a view of the conduit shown in FIG. 1 showing a plurality of longitudinal sections that respectively include a plurality of lateral modular segments.

Referring to FIG. 5, the conduit 14 includes a plurality of longitudinal sections 40. An exemplary embodiment of the conduit 14 is of such a large size that individual longitudinal sections 40 include a plurality of lateral modular segments 42 that are disposed orthogonally about the longitudinal axis of the conduit 14 to laterally enclose the interior of the individual longitudinal section 40.

In some embodiments, in at least some of the modular segments 42 are made by injection molding.

Figure 6:
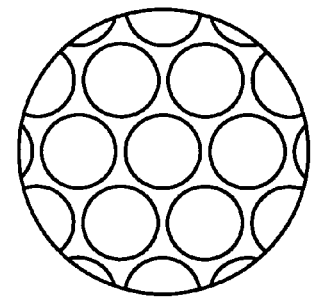
FIG. 6 illustrates an exemplary contour of the interior surface of the conduit shown in FIG. 1.

The surfaces of the modular segments 42 that define portions of the interior surface of the conduit 14 are relatively flat; and the surfaces of the modular segments that adjoin laterally adjacent modular segments 42 are flat and inclined at an obtuse angle to the interior surface of the conduit 14. Even though the surfaces of the modules that define portions of the interior surface of the conduit are relatively flat, such surface are of a repetitive varying contour that reduces friction between the interior surface and the air that is drawn through the conduit. In an exemplary embodiment, as shown in FIG. 6, the varying contour is similar to the contour of the exterior surface of a golf ball.

Figure 7:
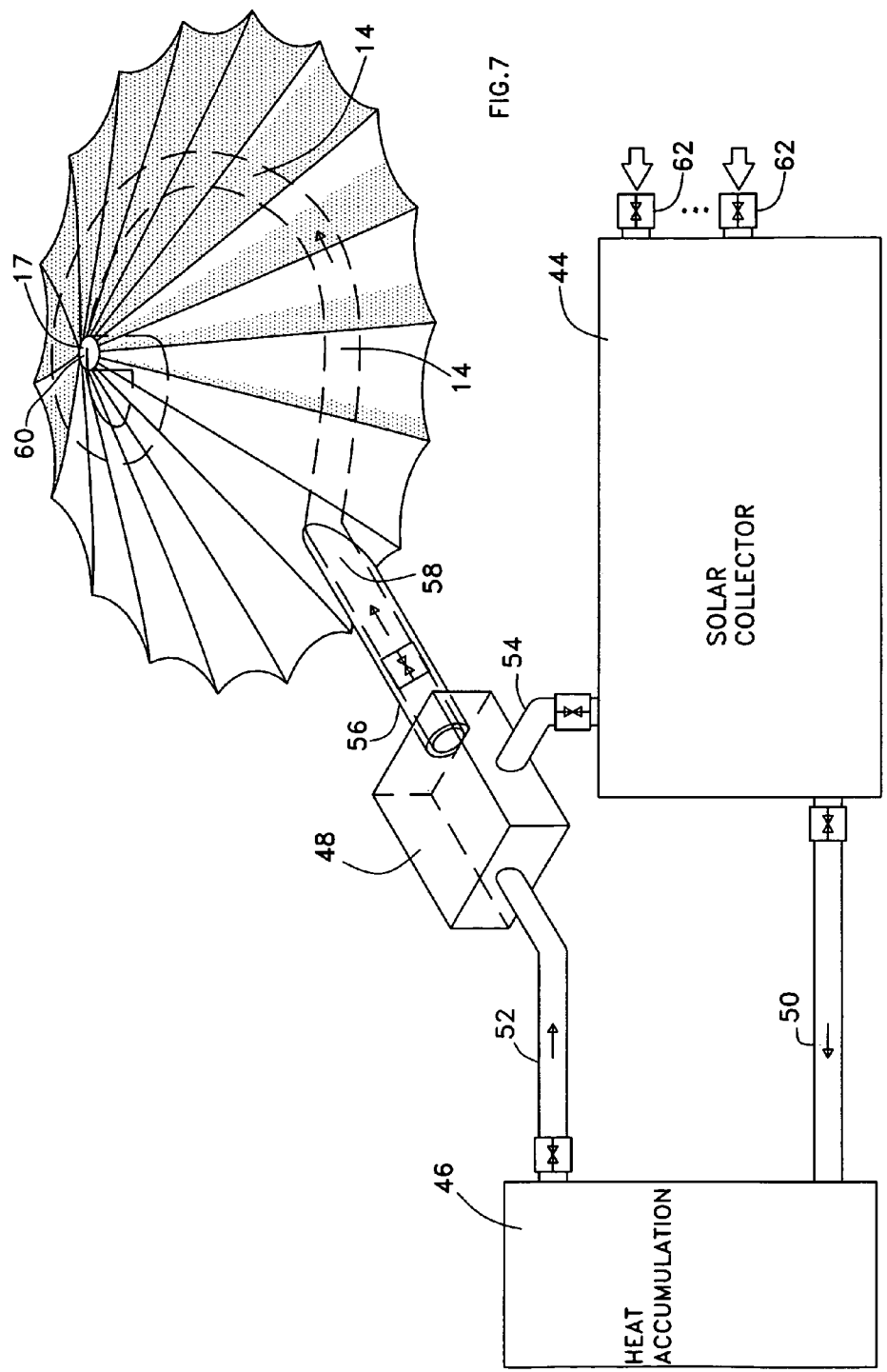
FIG. 7 is a schematic partial view of an exemplary embodiment of an energy conversion system that includes a conduit system according to the present invention in combination with a system for producing electrical energy and a heat accumulation system.

Referring to FIG. 7, an exemplary embodiment of an energy conversion system includes a conduit system 10 according to the present invention, as described above, in combination with a solar collector 44, a heat accumulation system 46 and a system 48 for producing electrical energy from a stream of heated air.

The heat accumulation system 46 is coupled to the solar collector 44 for accumulating heat at various times from a heated stream of air that collected by a conduit 50. The heat accumulation system 46 includes a heat transfer medium for accumulating heat from the heated air stream and a conduit 52 for conducting a stream of heated air from the heat transfer medium to the electrical energy producing system 48.

A stream of heated air is conducted to the electrical energy producing system 48 from the solar collector 10 via a conduit 54 and/or from the heat accumulation system 46 via the conduit 52 in accordance with how much heat is being provided by the stream of heated air that is flowing from the solar collector 44.

The electrical energy producing system 48 includes a turbine (not shown) and an electricity generator (not shown) coupled to the turbine for generating electricity in response to rotation of the blades of the turbine. The stream of heated air that is conducted to the electrical energy producing system 48 flows through the turbine to rotate the blades of the turbine and thereby cause the electricity generator to generate electricity.

This exemplary embodiment of an energy conversion system utilizes a conduit 56 that extends from the turbine into the sloping conduit 14 that is constructed on the outside of a high rise of terrain 11, such as a mountain, to draw the stream of heated air through the turbine. The conduit 14 extends from a first elevation 58 to the aforementioned second elevation 17 that is of a higher elevation than the first elevation 58. In one exemplary embodiment, the conduit 14 has an upward slope in the order of thirty degrees from horizontal; the change in elevation is on the order of one-to-two kilometers; and the length of the conduit system 10 is on the order of two-two-four kilometers.

The column of heated air in the conduit 14 is less dense than a similar column of cooler air in the atmosphere thereby creating a low pressure on the side of the turbine that is linked to the conduit relative to a high pressure on the side of the turbine that is linked to the solar collector 44 or the heat accumulator 46. Due to the difference in pressure, the stream of heated air is driven and/or drawn through the turbine. The partial vacuum also causes air to be drawn into the solar collector 44 through a plurality of air intake gates 60, and further maintains the flow of heated air throughout the energy conversion system 48.

The conversion of solar radiation to electric power that takes place in the energy conversion system of FIG. 7 is further described in the aforementioned International Patent Application No. PCT/US2008/008356, the disclosure of which is incorporated herein by reference. The terminology used herein to refer to some elements of the conversion system of FIG. 7 is different that the terminology used in said International Application to refer to the same or similar elements.

The benefits specifically stated herein do not necessarily apply to every conceivable embodiment of the present invention. Further, such stated benefits of the present invention are only examples and should not be construed as the only benefits of the present invention.

While the above disclosure contains many specificities that may or may not be common to all of the embodiments described herein, these specificities are not to be construed as limitations on the scope of the claimed invention, but rather as examples of the preferred embodiments described herein. For example the scope of the method claims should not be construed to cover only methods having the steps occur in the sequence recited herein. Other variations are possible and the scope of the present invention should be determined not by the embodiments described herein but rather by the claims and their legal equivalents. The claims require no implicit limitations. Each claim is to be construed explicitly as stated, or by its legal equivalent.

The invention claimed is:

1. A conduit system for use in an energy conversion system, comprising:
   a flexible conduit disposed on the outside of a high rise of terrain to draw a stream of heated air through the conduit, wherein the conduit extends from a first elevation to a second elevation that is of a higher elevation than the first elevation, with at least a portion of the conduit leading in a direction that is non-orthogonal to vertical and horizontal; and
   a support structure that supports a substantial portion of the flexible conduit in such a manner as to maintain a substantially uniform cross-sectional area of the conduit orthogonal to the longitudinal axis of the conduit wherein the support comprises:
   a plurality of pillars secured to the terrain and intermittently disposed adjacent to opposite sides of the conduit along a substantial portion of the length of the conduit; and
   a plurality of primary cables that so connect individual said pillars to portions of the conduit at various positions along the orthogonal perimeter of the conduit as to pull the portions of the walls of the conduit to which the pillars are connected away from the longitudinal axis of the conduit.

2. A conduit system according to claim 1, wherein the support structure further comprises:
   a plurality of grounded members secured to the terrain and intermittently disposed beneath the conduit along a substantial portion of the length of the conduit at positions that correspond to the positions of the pillars; and
   an additional plurality of primary cables that so connect individual said grounded members to portions of the conduit at various positions along the orthogonal perimeter of the conduit as to pull the portions of the walls of the conduit to which the grounded members are connected away from the longitudinal axis of the conduit.

3. A conduit system according to claim 2, wherein the support structure comprises:
   a plurality of bands disposed about the orthogonal perimeter of the conduit adjacent the pillars and the grounded members, wherein individual bands contain an arrays of fasteners that connect the primary cables to the conduit.

4. A conduit system according to claim 2, wherein some of the primary cables pull the lower portion of the conduit wall down from the longitudinal axis of the conduit.

5. A conduit system according to claim 2, wherein some of the primary cables pull side portions of the conduit away from the longitudinal axis of the conduit.

6. A conduit system according to claim 1, wherein some of the primary cables pull the upper portion of the conduit wall up from the longitudinal axis of the conduit.

7. A conduit system according to claim 1, wherein the support structure further comprises:
   a plurality of secondary cables, wherein some of the secondary cables connect some of the pillars to other said pillars, and others of the secondary cables so secure the pillars to the terrain as to maintain the pillars in a desired upright disposition.

8. A conduit system for use in an energy conversion system, comprising:
   a conduit disposed along a high rise of terrain to draw a stream of heated air through the conduit, wherein the conduit extends from a first elevation to a second elevation that is of a higher elevation than the first elevation, with a section of the conduit leading in a direction that is non-orthogonal to vertical and horizontal, and wherein at the higher elevation, the conduit divides into a plurality of branch conduits;
   a grid of one or more valves disposed at the upper end of each branch conduit for releasing the air from the branch conduits into an external environment; and
   sensors for sensing the air pressure within the branch conduits;
   wherein the valves can be operated to regulate air pressures within the branch conduits.

9. A conduit system according to claim 8, further comprising:
   sensors for sensing the external wind pressures adjacent the upper ends of the respective branch conduits;
   wherein the controllers are adapted for optimizing the balance of the air pressures within the plurality of the branch conduits in accordance with the sensed external wind pressures.

10. A method of utilizing a sloping conduit to facilitate conversion of heated air to electrical energy, comprising the steps of:
    (a) conducting the stream of heated air to a turbine that is coupled to an electricity generator in an electrical energy producing system for generating electricity when the turbine is rotated; and
    (b) drawing the stream of heated air through the turbine by using a sloping conduit that is disposed on the outside of a high rise of terrain and extends from a first elevation to a second elevation that is of a higher elevation than the first elevation, to thereby rotate the turbine and cause electricity to be generated;
    wherein at least a significant portion of the conduit leads in a direction that is non-orthogonal to vertical and horizontal; and
    wherein the conduit is flexible and is supported by pillars, ground members and cables, that support a substantial portion of the flexible conduit in such a manner as to maintain a substantially uniform cross-sectional area of the conduit orthogonal to the longitudinal axis of the conduit.

11. A method of utilizing a sloping conduit to facilitate conversion of heated air to electrical energy, comprising the steps of:
    (a) conducting the stream of heated air to a turbine that is coupled to an electricity generator in an electrical energy producing system for generating electricity when the turbine is rotated; and (b) drawing the stream of heated air through the turbine by using a sloping conduit that is disposed on the outside of a high rise of terrain and extends from a first elevation to a second elevation that is of a higher elevation than the first elevation, to thereby rotate the turbine and cause electricity to be generated;

wherein at least a portion of the conduit leads in a direction that is non-orthogonal to vertical and horizontal; and wherein at the higher elevation, the conduit divides into a plurality of branch conduits;

the method further comprising the steps of:

(c) utilizing a grid of one or more valves at the upper end of each branch conduit to release the air from the branch conduits into an external environment;

(d) sensing the air pressure within the branch conduits; and (e) controlling the operation of the valves to regulate air pressures within the branch conduits.

* * * * *